United States Patent
Hargrove et al.

(10) Patent No.: US 7,791,008 B2
(45) Date of Patent: Sep. 7, 2010

(54) SINGLE SPOT FOCUS CONTROL

(76) Inventors: John Taylor Hargrove, 1039 Hoomaikai St., Honolulu, HI (US) 97817; Ulf Peter Gustafsson, 1720 Ala Moana Blvd., Apt. 807B, Honolulu, HI (US) 96815

( * ) Notice: Subject to any disclaimer, the term of this patent is extended or adjusted under 35 U.S.C. 154(b) by 232 days.

(21) Appl. No.: 12/221,267

(22) Filed: Jul. 31, 2008

(65) Prior Publication Data
US 2010/0025566 A1    Feb. 4, 2010

(51) Int. Cl.
G02B 27/64 (2006.01)
(52) U.S. Cl. ............. 250/201.2; 250/201.3; 250/201.4; 356/609; 356/624
(58) Field of Classification Search ............. 250/201.2, 250/201.3–201.4; 356/609, 624
See application file for complete search history.

(56) References Cited
U.S. PATENT DOCUMENTS 4,948,249 A * 8/1990 Hopkins et al. ............. 356/121
5,101,236 A * 3/1992 Nelson et al. ............... 347/239
7,700,903 B2 * 4/2010 Weiss et al. ............. 250/201.2

* cited by examiner

Primary Examiner—Georgia Y Epps
Assistant Examiner—Kevin Wyatt

(57) ABSTRACT

The present invention discloses methods and systems for improved focusing of imaging systems for the acquisition of high-quality focused tissue image data. A light emitter (L) aims a focusing light beam (FLB) towards an object of interest (O) so that the focusing light beam (FLB) is at an angle relative to the optical axis (OA) of the imager (I). If the object of interest (O) is out of focus, the focusing light spot (FLS) will appear above or below the focal point in the image (I). The pixel difference between the center of the focusing light spot (FLS) and the focal point indicates the range adjustment value. The range between the imager (I) and the object of interest (O) can then be adjusted according to the range adjustment value using a lookup table or calculations.

21 Claims, 6 Drawing Sheets

| Spot position | Range adjustment | Spot position | Range adjustment |
|---|---|---|---|
| -26 | -23.4277 | +26 | 19.7804 |
| -25 | -22.4563 | +25 | 19.0358 |
| -24 | -21.4860 | +24 | 18.2939 |
| -23 | -20.5191 | +23 | 17.5556 |
| -22 | -19.5575 | +22 | 16.8213 |
| -21 | -18.6026 | +21 | 16.0906 |
| -20 | -17.6552 | +20 | 15.3624 |
| -19 | -16.7156 | +19 | 14.6351 |
| -18 | -15.7834 | +18 | 13.9069 |
| -17 | -14.8582 | +17 | 13.1763 |
| -16 | -13.9394 | +16 | 12.4421 |
| -15 | -13.0265 | +15 | 11.7035 |
| -14 | -12.1190 | +14 | 10.9602 |
| -13 | -11.2167 | +13 | 10.2120 |
| -12 | -10.3191 | +12 | 9.4590 |
| -11 | -9.4260 | +11 | 8.7008 |
| -10 | -8.5373 | +10 | 7.9373 |
| -9 | -7.6531 | +9 | 7.1680 |
| -8 | -6.7739 | +8 | 6.3927 |
| -7 | -5.9006 | +7 | 5.6114 |
| -6 | -5.0341 | +6 | 4.8242 |
| -5 | -4.1752 | +5 | 4.0315 |
| -4 | -3.3244 | +4 | 3.2339 |
| -3 | -2.4820 | +3 | 2.4318 |
| -2 | -1.6476 | +2 | 1.6256 |
| -1 | -0.8206 | +1 | 0.8151 |
| 0 | 0.0000 | | |

FIG. 2

SINGLE SPOT FOCUS CONTROL

TECHNICAL FIELD

This invention generally relates to medical imaging and more specifically to methods of focusing imaging systems or optical instruments to obtain high-quality diagnostic image data from tissue.

BACKGROUND ART

In the field of medicine, it is common to perform a visual examination to diagnose a disease. For example, visual examination of the cervix can be used to identify regions with a high likelihood of abnormal pathology. An important requirement to be able to visually identify abnormal tissue in a region is the ability to accurately and rapidly focus an imaging device (such as an imaging system or optical instrument) accurately on the region. To focus an imaging device, the region of interest must be the correct distance from the imager's "focal point". Although several methods have been developed for accurate and rapid focusing, they generally rely on multiple light beams or complicated image processing algorithms. The present invention is a simple focusing process that does not use multiple light beams. It addresses the shortcomings of current methods by improving the accuracy, speed, and robustness of focusing methods used in imaging systems or optical instruments.

The following patents and patent applications may be considered relevant to the field of the invention:

U.S. Pat. No. 4,065,778 to Harvey, incorporated herein by reference, discloses an automatic rangefinder and focusing apparatus is provided for use with a camera for determining the distance from an object to be photographed to the film plane of the camera and for positioning the camera's objective lens to focus an image of the object in the film plane.

U.S. Pat. No. 4,494,868 to Lambeth, incorporated herein by reference, discloses an improved automatic rangefinder device having means for projecting a beam of light to illuminate a spot on a distant object, and an image sensor for viewing the object and determining the distance thereto by the observed position of the illuminated spot is disclosed.

U.S. Pat. No. 5,061,062 to Schneiter, incorporated herein by reference, discloses a focus spot controller for a variable depth triangulation ranging system, the ranging system including apparatus for emitting a light bean to be focused onto an object, light sensitive apparatus, lens apparatus for imaging reflected light onto the light sensitive apparatus, and apparatus for calculating system geometry and range from signals received from the light sensitive apparatus.

U.S. Pat. No. 6,277,067 to Blair, incorporated herein by reference, discloses a focusing method of overlapping two laser beams at the focal point of a portable hand-held colposcope.

U.S. Pat. No. 7,253,384 to Barnes et al., incorporated herein by reference, discloses an apparatus comprising of a movable optical element having an optical axis and including one or more focusing elements, and image sensor position along the optical axis, and a radiation source attached to the movable optical element. The radiation source directs a beam onto the sensor at a selected angle relative to the optical axis. It also discloses a process that includes positioning a sensor along an optical axis of a movable optical element, projecting radiation beam at a selected angle onto the sensor from a radiation source attached to the movable optical element and adjusting the position of the movable optical element until the position where the radiation beam falls on eh sensor corresponds to the position where the radiation beam is expected to fall on the sensor when the movable optical element is in focus.

U.S. Patent Application Publication No. 2004/0206882 to Banks et al., incorporated herein by reference, discloses a method and apparatus for evaluating image focus that includes a focusing method that uses four light spots that are projected and aligned with four focusing elements. The invention also discloses automatic adjustment of the image focus.

U.S. Patent Application Publication No. 2003/0184856 to Otaki, incorporated herein by reference, discloses a focus point detection device comprises an illuminator that illuminates a specimen obliquely by letting a light flux at an angle to an optical axis of an objective lens enter in such a way that the optical axis and the light flux cross each other in the vicinity of a point in focus at an object side of the objective lens, an image-forming device that forms an image of the observation plane by converging a light from the observation plane of the specimen via the objective lens and a light amount detector that detects amount of light in response to the image formed by the image-forming device with a light sensor, wherein the light amount detector detects a light other than a regular reflection light from a surface of the specimen. Also, a fluorescence microscope comprises the focus point detection device and the infinity objective lens.

DISCLOSURE OF INVENTION

The presently preferred embodiment of the invention provides a method of focusing an imager comprising placing an object of interest within the field of view of an imager having a focal plane, and emitting a focusing light beam at a beam angle relative to the optical axis of the imager. The focusing light beam intersects with the focal plane of the imager at an imager focal point. The imager focal point may be on the optical axis of the imager, but this is not necessary. The focusing light beam creates a focusing light spot. The focusing light spot has a center that is a vertical spot value from the imager focal point. The pixel difference between the vertical spot value and the imager focal point is determined and this pixel difference is used to obtain a range adjustment value. Moving the imager according to the range adjustment value achieves a focused state.

Another preferred embodiment uses beam spot image processing to determine the location of the center of the focusing light spot using a center of mass technique. The pixel difference between the center of mass and the known imager focal point is calculated and used to obtain the range adjustment value. Manually or automatically moving the imager according to the range adjustment value achieves a focused state.

The presently preferred embodiment of the invention provides a simple focusing system comprising a controllable light source; an imager; an object of interest; and a light emitter. The system includes indicators and messages, and can be used for both manual and automatic focusing mechanisms.

A preferred embodiment of the system includes a cross-polarized light source to suppress glint.

BRIEF DESCRIPTION OF DRAWINGS

FIG. 1(A) depicts the focus system being in focus, FIG. 1(B)

depicts the focus system out of focus when the object of interest (here, a region of tissue), is too close to the imager, and FIG. 1(C) depicts the focus system out of focus when the object of interest is too far from the imager.

FIG. 2 shows an example of a look-up table for focus spot position and the required range adjustment of the imager to place the focal plane at the position of the object of interest.

FIG. 6(A) depicts the target being too far from the imaging device and the focusing message telling the operator "move system closer", and in FIG. 6(B) the target being too close to the imaging device and forming the message "move system away".

BEST MODES FOR CARRYING OUT THE INVENTION

Overview

The presently preferred embodiment of the invention described herein discloses a focusing system and focusing method that together provide feedback to an operator of an imaging device (an imager) and either manually or automatically positions the imager such that an object of interest lies at the focal point of the imager.

Figure 1A:
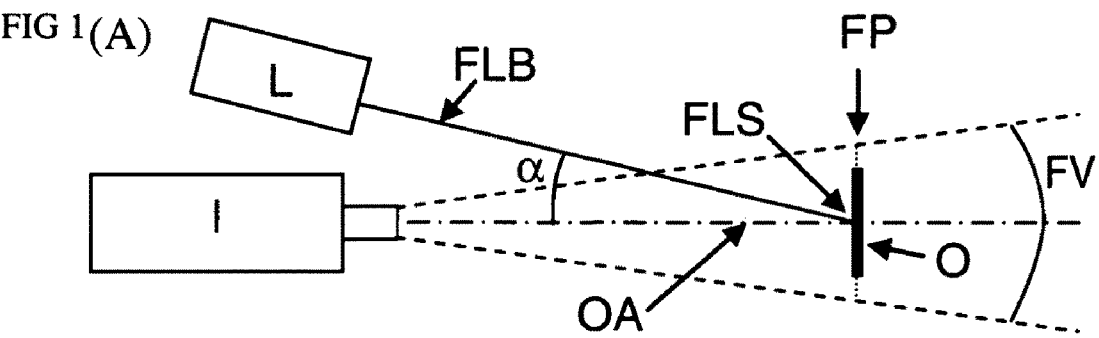
FIG. 1(A), FIG. 1(B), and FIG. 1(C) are diagrams illustrating the possible positions of the focus light spot relative to the object of interest (here, a region of tissue), the imaging system, and imager focal point, for three different focus states.
Figure 1B:
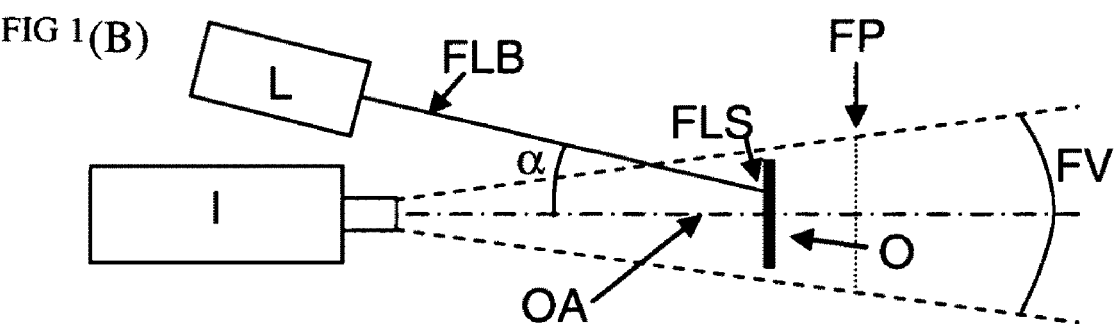
Figure 1C:
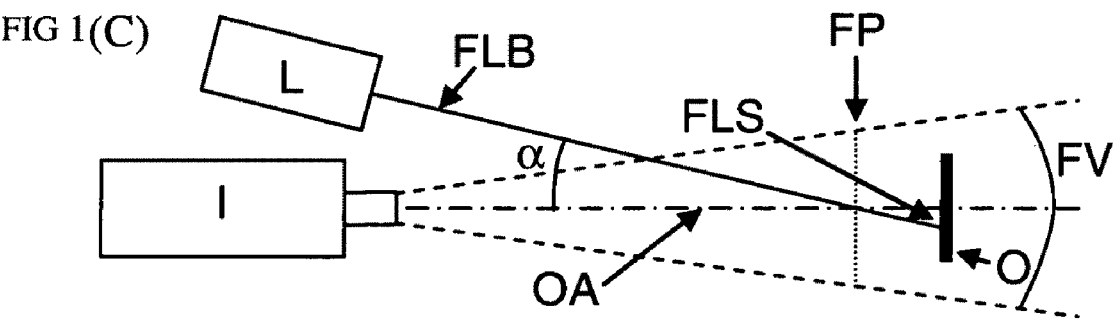

The focus system utilizes a light emitter (L) positioned to aim a focusing light beam (FLB) towards an object of interest (O) such that the focusing light beam (FLB) is positioned at an angle relative to the optical axis (OA) of the imager (I). The focus system is diagrammed in FIGS. 1(A), 1(B) and 1(C). FIG. 1(A) depicts the focus system in focus (when the object of interest (O) is in the focal plane of (FP) of the imager (I); FIG. 1(B) depicts the focus system out of focus when the object of interest (O) is too close to the imager (I), and FIG. 1(C) depicts the focus system out of focus when the object of interest (O) is too far from the imager (I).

As shown in FIG. 1(A), there is a beam angle (α) between the optical axis (OA) of the imager (I) and the focusing light beam (FLB) from the light emitter (L). Because of this angle, if the object of interest (O) is positioned too close to the imager (I), a focus light spot (FLS) will appear in the upper part of the image (upper pixels of the image) as shown in FIG. 1(B). If the object of interest (O) is positioned too far from the imager (I), the focus light spot (FLS) will appear as a light spot in the lower part of the image (lower pixels of the image) as shown in FIG. 1(C). This basic principle is utilized by the present invention to determine the focus position and the required range adjustment of the imager (the distance the imager should be from the object of interest) to move the imager (I) so that the object of interest (O) becomes focused.

The present invention is operable when the angle α is approximately between the ranges of 2 to 60 degrees. Preferably the angle α should be approximately in the range of 4 to 15 degrees. Optimally, the angle should be approximately in the range of 5 to 8 degrees.

In FIG. 1(A), the focusing light beam (FLB) intersects the focal plane (FP) of the imager (I) on the optical axis (OA), which corresponds with the center position of the imaging system. Alternatively, the beam angle α can be chosen such that the focusing light beam (FLB) intersects the focal plane of the imager at any position within the field of view (FV) of the imager (I), and not just on the optical axis.

The following description follows the illustration in FIG. 1(A)-FIG. 1(C) but it will be appreciated by those skilled in the art that the description applies to any position of the focus system relative to the imager.

Focus Analysis

Focus analysis is the determination of the imager's current focus state (in focus or out of focus) by locating the focusing light spot (FLS) (which is formed when the focusing light beam (FLB) falls on the object of interest (O)) in an image through beam spot image processing. Beam spot image processing is a series of steps to determine the center of the focusing light spot (FLS) in an image. Range adjustment is the conversion of the product of focus analysis into a distance the imager (I) should be moved relative to the object of interest (O) in order to achieve a focused state.

In one preferred embodiment, the focal point (P) (where the focusing light beam (FLB) intersects the focal plane (FP) of the imager (I)) is recorded as the parameter focusline. An image coordinate system is set so that the vertical spot value increases from the top to bottom of the image. Thus, when the object of interest (O) is too close to the imager, the vertical spot value of the focusing light spot (FLS) is smaller than focusline and this pixel difference, the variable pixdist, is negative. Similarly, when the object of interest is too far, the vertical spot value of the focusing light spot (FLS) is larger than focusline, and pixdist is positive. The positive or negative sign of pixdist thus removes any ambiguity as to the direction of the range adjustment: move away is positive and move closer is negative. The main task is then to convert pixdist to a physical distance to move the imager (I).

The preferred embodiment of the invention achieves this by utilizing a look-up table between pixdist and the range adjustment. The relationship between pixdist and range adjustment is itself dependent upon range, and is nonlinear. This can be seen in FIG. 1(A), FIG. 1(B), and FIG. 1(C). The dashed lines in the FIG. 1(A), FIG. 1(B), and FIG. 1(C) all delineate the field of view (FV) of the imager (I). When the object of interest (O) is too close as shown in FIG. 1(B), the imager (I) trains its pixels on a smaller target area, so a larger magnitude position difference will result from the same magnitude distance out of focus, when compared to when the object of interest (O) is located too far away as shown in FIG. 1(C).

It is presently preferred to populate the look-up table empirically, that is, through actual experience. For each individual imager, the entries for this look-up table can be determined at the time of manufacture, by noting vertical spot value for a series of targets placed along a range gauge. FIG. 2 shows an example of a look-up table for the focus spot position relative to the in-focus position of zero, and the required range adjustment of an imager (I). For this particular look-up table, a positive range adjustment means that the imager (I) should be moved away from the object of interest (O) and a negative number means that the imager (I) should be moved closer. Alternatively, if the relevant angles and ranges of the device are known precisely, it is possible to populate the look-up table using an analytical formula, thereby saving the time and expense of the empirical calibration routine.

Beam Spot Image Processing

For more accurate focusing, the preferred embodiment of the invention uses beam spot image processing. Beam spot image processing is a series of steps to determine the center of the focusing light spot (FLS) in an image more precisely using a center of mass technique. The pixel difference between the center of mass of the focusing light spot (FLS) and the focal point (P) of the imager (I) is then calculated. Range adjustment is then determined using a look up table.

The process begins by acquiring an image of the object of interest (O). An RGB color image typically consists of red, blue, and green bands. Although the present invention preferably uses a color imager, the focus system also works using a monochrome imager. A grayscale (black and white) version of an example color image is shown as FIG. 3.

For a color imager, the image of the focusing light spot (FLS) tends to be saturated or near saturated in the color band that correlates with the color of the light emitter (L). For example, an 8-bit imaging system (in which numbers are represented by 8 digits of 1 or 0, (binary), with the maximum number therefore being $2^8$ or 256), the pixel values (intensity or brightness) in the focusing light spot FLS are usually at or near, say, 240. The present invention preferably takes that color band image (for example the red band for a red light emitter) and makes a map of all pixels with values greater than 240. Some pixels within the spot tend to be unsaturated due to interference effects; the threshold is set at 240 for every pixel within the spot. This map of (near) saturated pixels is then applied to another color band (for example the green band) image, which is less subject to saturation by the focusing light spot. At pixels where the value in the first color band image is 240 or above, the value in the second color band image is preserved, and at pixels where the value in the first image is less than 240, the values in the second image are set to zero.

The center of the light spot (or focusing light spot) is further refined by adaptively setting a threshold for the second color band. One method for setting a threshold consists of calculating a histogram of the image values in the second color band image and selecting a threshold that corresponds, for example, to approximately 15% of the brightest pixels. The pixels in the second color band with values lower than this threshold are set to zero.

This approach to determining the threshold for focusing spot definition in the second color band image is adopted because it is flexible. While the first color band image typically tends to saturate, allowing a hard threshold of 240 to be set, the intensity of the second band's color images can vary widely. By using the first color band image to define a set of the second color band's brightest pixels and subsequently narrowing this population, the brightest pixels can be determined regardless of whether the color image tends to be bright or dark, due to color variation of the object under study and varying ambient light conditions.

For a monochrome imager, the same approach as for the second color band image can be utilized. For this type of imager, however, it is important to set the intensity of the light emitter to well below saturation, typically at the lower ¼ of the dynamic range (range of brightness and darkness that can be imaged) of the imager. A monochrome imager will typically be more sensitive to color variation of the object under study and varying ambient light conditions.

The beam spot image processing then preferably quantifies the location of the light spot (LS) by locating the center of focusing light spot (FLS) using a center of mass technique applied to the image, where the value of pixel brightness is analogous to mass, and the coordinate system is that of the image. For example, an (i,j) coordinate system can be utilized, with the origin at top left, i increasing downward, and j increasing rightward. Recalling that pixels with values less than the threshold have been cut to zero, so may be considered to have no mass, the vertical pixel number (i) corresponding to the image center of mass, ci, which is obtained from $$ci = \frac{1}{\sum_{i=1}^{n}\sum_{j=1}^{m}m_{ij}}\sum_{i=1}^{n}\sum_{j=1}^{m}m_{ij}*i, \quad (1)$$

where $m_{ij}$ is the mass (brightness) of pixel (i,j). For a focus system with the light emitter positioned on either side of the imaging system, the horizontal pixel number is determined.

The pixel difference between the center of mass of the focusing light spot FLS and the known pixel location of the camera (imager) focal point FP is obtained as pixdist=$ci$−focusline. (2)

The focus analysis then passes pixdist to the look-up table which matches various values of pixdist to the range adjustments (r) required of the imaging system in order to place the object under study in focus. For values of pixdist lying between table entries, the corresponding value of r is determined by linear interpolation. The distance between table entries is variable; with the entries spaced the closest near pixdist=0 in order to reduce interpolation error for the small movements required when very near to focus.

Range Resolution

The preferred embodiment of the invention also includes the calculating of the focus system's range resolution. Range resolution is defined as the minimum difference in range for which focus states can be distinguished as different.

The range resolution of the focus system is dependent upon the resolution of the imager and the angle α. In order to be able to detect out of focus states, at least one vertical image pixel must be illuminated by the light beam. In other words, pixdist must have an absolute value of at least one. When the pixel size of the imager is smaller, the out of focus state can be determined for smaller distances of the object of interest from the imager focal point. This measure of vertical resolution, dh, can be related to the range resolution dr by Equation (1):

$dr=dh*cot\, α.$ (3)

As an example, if α=6.3° the formula becomes dr=0.1 mm*cot(6.3°)=0.8 millimeters (mm). Therefore, for this particular example, the focus system should be capable of placing the imager within 0.8 mm or about 1 mm of the focal point of the object of interest.

Imaging System

The imaging system includes an imager having a number of pixels, each of a specific pixel size, and, preferably includes a fixed focus or step zoom optics with appropriate focal length, field of view, and depth of field for the imaging task at hand. Fixed focus or step zoom optical systems provide exact measures of the focal length of the imaging system, and as such, look-up tables for each focal length can be determined. In a continuous zoom system, the exact focal length can be anything within the focal range of the optical system necessitating the use of an almost infinite number of look-up tables. It should be noted, however, that for continuous zoom imaging systems in which the focal length can be precisely determined, a limited number of look-up tables can be used together with interpolation to estimate the focus position and range adjustment not included in the measured look-up tables.

Figure 3:
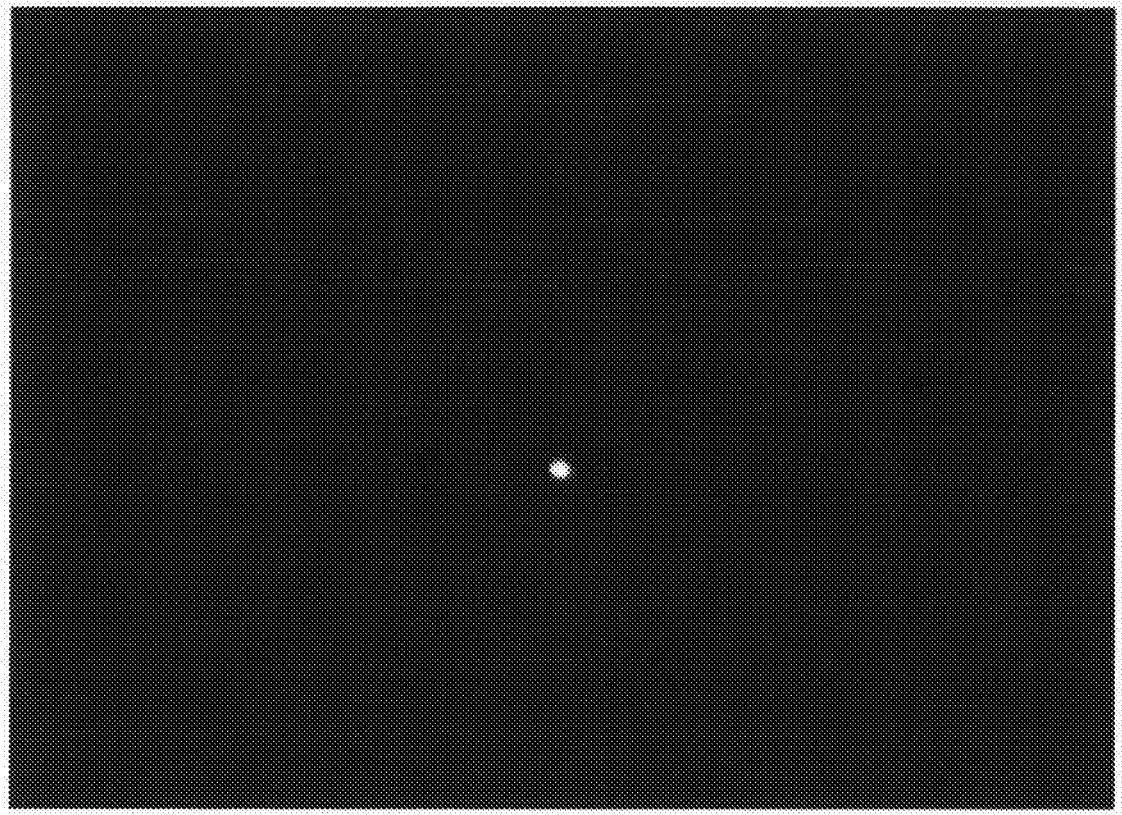
FIG. 3 shows a sample image without illumination except for the focus light spot.

In one embodiment of the invention, whenever the imaging system includes a controllable light source, this light source is deactivated during the focus image collection step. This circumvents the problem of specular reflection (glint) on the object under study. Pixels which are saturated in the focus image due to factors other than the focusing illumination may create errors in determining the focusing light spot's center of mass. The pixels which are saturated due to glint form clusters smaller in size that the cluster of pixels saturated by the light spot. The focus analysis will usually be quicker, more accurate, and more robust if not tasked with the additional burden of distinguishing saturated pixels not originating from the light spot. Deactivation of the imaging system light source results in an image which is completely dark except for the light spot, as illustrated in FIG. 3.

Figure 4:
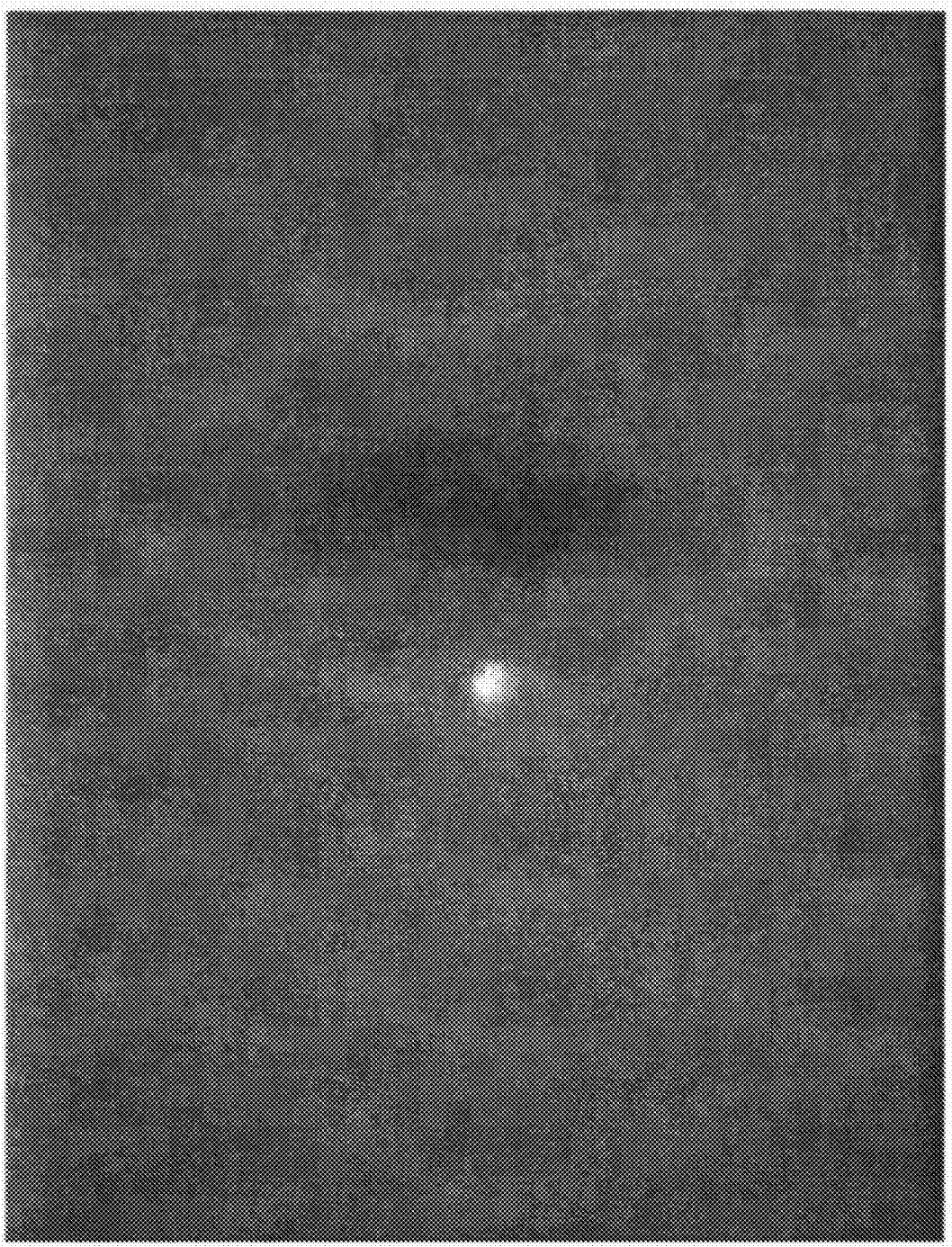
FIG. 4 shows a sample image with target illumination of the cervix using cross-polarized light and the focus light spot.
Figure 5:
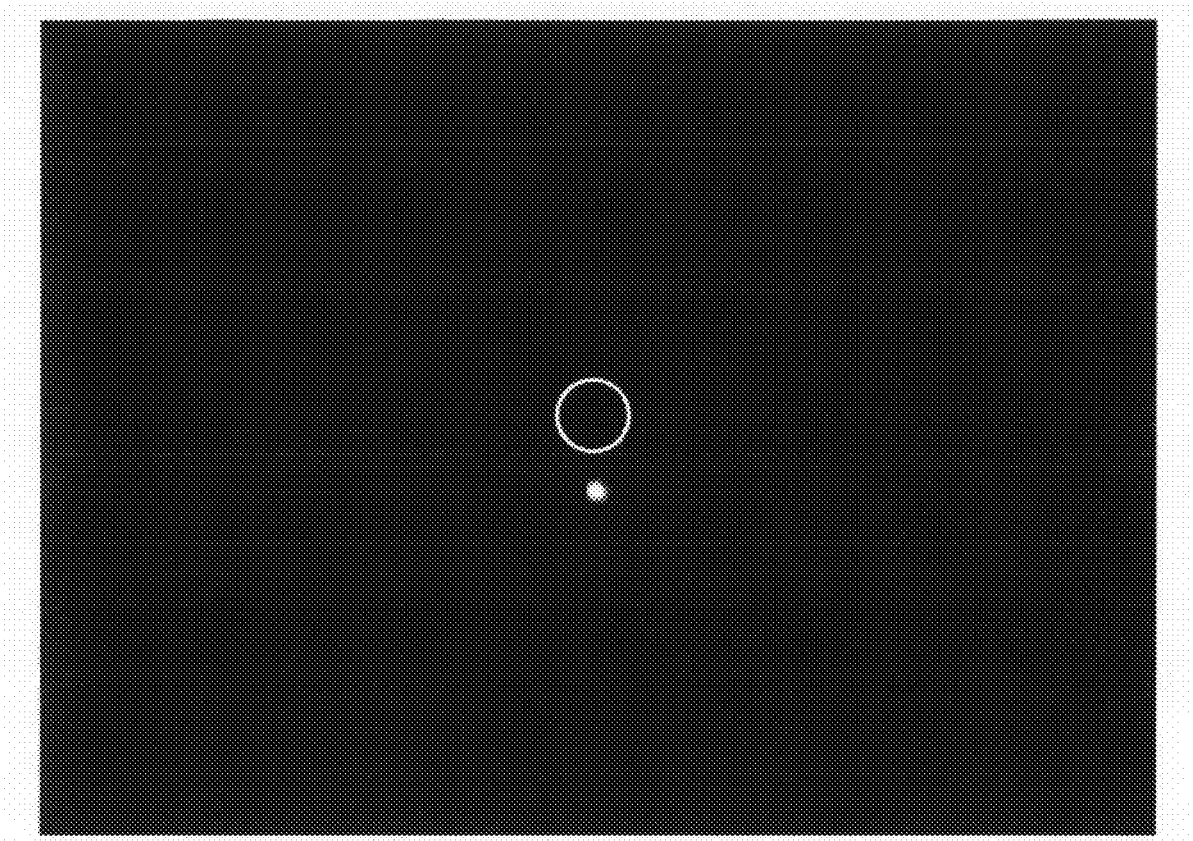
FIG. 5 shows a sample image without illumination except for the light spot, and a circular focus indicator.

In another preferred embodiment of the invention, the imaging system includes a cross-polarized light source and detector (that is, use of at least two polarized filters, light sources or other lighting means having polarization directions that cross each other). This circumvents the problem of saturated specular reflection (glint) on the object under study. The cross-polarization of the system suppresses glint and the focus light spot is always the brightest feature in the image, so the algorithm does not face the additional burden of distinguishing saturated pixels not originating from the focus light spot. In this preferred embodiment, the light source is able to remain on during the focusing process, as illustrated in FIG. 4. FIG. 5 shows a sample image without illumination except for the light spot, and a circular focus indicator.

Light Emitter

In order for the focus system to find and analyze the light spot, the output of the light emitter must be visible to the imaging system. For human viewing of the light spot, and manual focusing (described below), the light emitter should also be visible to the human eye.

Preferably, the light emitter is a laser diode with an output power, beam diameter and divergence adjustable to the imaging task at hand and the required resolution of the focusing system. A larger beam diameter means a larger light spot, which, in turn, means increased errors in determining the position of the light spot, and thus, the range adjustment. In situations involving human interaction with the imager, it is important to consider the eye safety aspect of the laser diode. In these situations, a Class II laser diode is preferred.

It should be noted that other types of light emitters can also be used. If non-laser or non-coherent light emitters are used, the focusing system would preferably be supplemented with a pinhole to limit the size of the beam and a lens or lens system to focus the emitted light onto the object under study.

Manual and Automatic Focusing

Figure 6A:
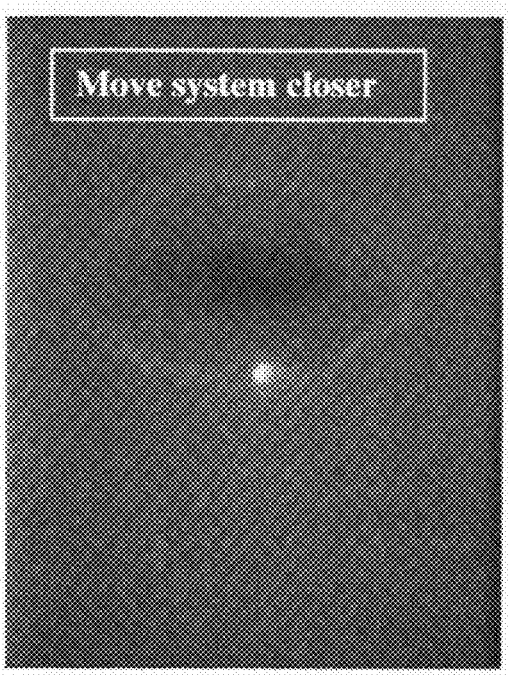
FIG. 6(A) and FIG. 6(B) show sample images with the light spot and focusing messages.
Figure 6B:
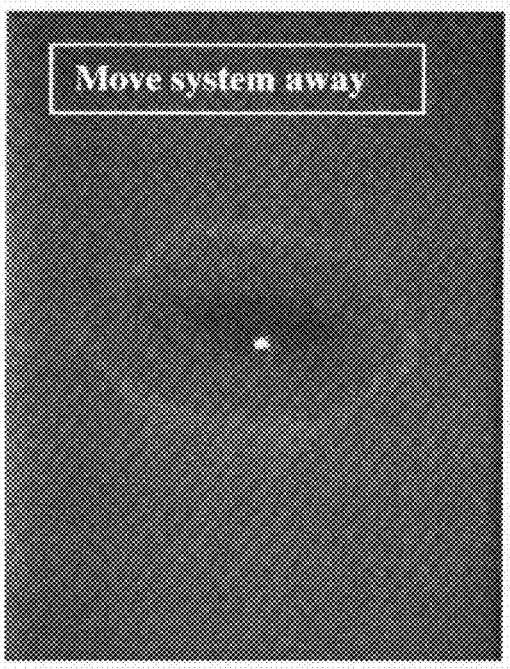

The imager can be either manually or automatically focused. In manual focusing, the imager is manually positioned by a human operator. In one embodiment, the focus position could be indicated on a viewing screen which displays the scene captured by the imaging system. One indicator is illustrated in FIG. 4 in which a circle shows the focus position, and once the operator of the imager places the light within the circle, the object under study is in focus. Other indicators could include squares, cross-hairs, and other alternatives obvious to those skilled in the art. A display message could also be relayed to the operator, as illustrated in FIG. 6. Here, a message informs the operator or user of the direction in which the imager should be moved to focus on the object of interest. In automatic focusing, preferably a motorized translation stage (a component of a motion system used to restrict an object to a single axis of motion) positions the imager based on the position of the imager and the light spot.

While the present invention has been particularly shown and described with reference to embodiments described in the detailed description and illustrated in the figures, it will be understood by one skilled in the art that various changes in detail may be effected therein without departing from the spirit and scope of the invention, as defined by the claims. Accordingly, no limitations are to be implied or inferred except as explicitly set forth in the claims.

INDUSTRIAL APPLICABILITY

The present invention discloses a focus system and methods of focusing imaging systems or optical instruments to obtain high-quality diagnostic image data from tissue. It can used for any diagnostic imaging purpose in which an image must be focused quickly and accurately.

What is claimed is:

1. A method for focusing a color imager having an imager field of view, an imager optical axis and an imager focal plane comprising:
    placing an object of interest in front of said color imager;
    emitting a focusing light beam at a beam angle relative to said imager optical axis that intersects said imager focal plane within said imager field of view at an imager focal point, onto said object of interest to create a focusing light spot;
    acquiring a color image of said focusing light spot on said object of interest using said imager, wherein said color image has at least two color bands and has pixels with pixel values near saturation for at least one of said color bands;
    mapping pixels having pixel values near saturation in a first color band to provide a pixel map of said focusing light spot in said first color band;
    setting a threshold for pixel values in a second color band in said pixel map, whereby pixels brighter than said threshold in said second color band can be determined, resulting in brightest pixels;
    determining a center of mass to determine the center of said brightest pixels;
    determining a pixel difference between said center of said brightest pixels and said imager focal point;
    obtaining a range adjustment based on said pixel difference; and
    moving said imager according to said range adjustment to minimize said pixel difference.

2. A method according to claim 1, wherein:
    said setting step is performed using a threshold that corresponds to approximately 15% of said pixels in said second color band in said pixel map resulting in brightest pixels.

3. A method according to claim 1, wherein:
    said beam angle is set so that said focusing light beam intersects said focal plane at said imager optical axis.

4. A method according to claim 1, wherein said emitting and acquiring steps are performed using cross polarized light to suppress glint.

5. A method according to claim 1, wherein said emitting step is performed using a beam angle of between approximately 2 and approximately 60 degrees.

6. A method according to claim 5, wherein said emitting step is performed using a beam angle of between approximately 4 and approximately 15 degrees.

7. A method according to claim 6, wherein said emitting step is performed using a beam angle of between approximately 5 and approximately 8 degrees.

8. A focus system for an object of interest, comprising:
    a color imager having an imager field of view, an imager focal plane, and an imager optical axis;

a light emitter to emit a focusing light beam at a beam angle relative to said imager optical axis that intersects said imager focal plane within said imager field of view at an imager focal point, whereby emitting said focusing light beam onto said object of interest creates a color image of a focusing light spot in said imager, said color image having at least two color bands and having pixels with pixel values near saturation for at least one of said color bands;

mapping means to make a map of all pixels in said color image that are near saturation in one color band;

thresholding means to select brightest pixels in a second color band in said map;

locating means to locate the center of mass of said brightest pixels;

range adjustment means to determine a range adjustment from any pixel difference between said center of said brightest pixels and said imager focal point.

9. A focus system according to claim 8, wherein said beam angle is set so that said focusing light beam intersects said focal plane at said imager optical axis.

10. A focus system according to claim 8, wherein said light emitter emits polarized light, further comprising a polarizing filter before said imager, whereby said color image is formed using cross-polarized light to suppress glint.

11. A focus system according to claim 8, wherein said beam angle is between approximately 2 and approximately 60 degrees.

12. A focus system according to claim 11, wherein said beam angle is between approximately 4 and approximately 15 degrees.

13. A focus system according to claim 12, wherein said beam angle is between approximately 5 and approximately 8 degrees.

14. A method for focusing a monochrome imager having an imager field of view, an imager optical axis and an imager focal plane, comprising:

placing an object of interest in front of said monochrome imager;

emitting a focusing light beam at a beam angle relative to said imager optical axis that intersects said focal plane within said imager field of view at an imager focal point, onto said object of interest to create a focusing light spot;

acquiring a monochrome image of said focusing light spot on said object of interest using said imager, wherein said monochrome image has maximum pixel values well below saturation;

setting a threshold for pixel values, whereby pixels brighter than said threshold can be determined, resulting in brightest pixels;

determining a center of mass to determine the center of said brightest pixels;

determining a pixel difference in said image between said center of said brightest pixels and said imager focal point;

obtaining a range adjustment based on said pixel difference; and moving said object of interest according to said range adjustment to minimize said pixel difference.

15. A method according to claim 14, wherein:
said acquiring step is performed with maximum pixel values in the lower ¼ of the dynamic range of said pixels.

16. A method according to claim 14, wherein:
said setting step is performed using a threshold that corresponds to approximately 15% of said pixels resulting in brightest pixels.

17. A method according to claim 14, wherein:
said beam angle is set so that said focusing light beam intersects said focal plane at said imager optical axis.

18. A method according to claim 14, wherein said emitting and acquiring steps are performed using cross polarized light to suppress glint.

19. A method according to claim 14, wherein said emitting step is performed using a beam angle of between approximately 2 and approximately 60 degrees.

20. A method according to claim 19, wherein said emitting step is performed using a beam angle of between approximately 4 and approximately 15 degrees.

21. A method according to claim 20, wherein said emitting step is performed using a beam angle of between approximately 5 and approximately 8 degrees.

* * * * *